Aug. 7, 1962 J. J. KOLTHOF ET AL 3,048,379
APPARATUS FOR DEGASIFYING WATER, PARTICULARLY
BOILER FEED WATER
Filed Oct. 19, 1960
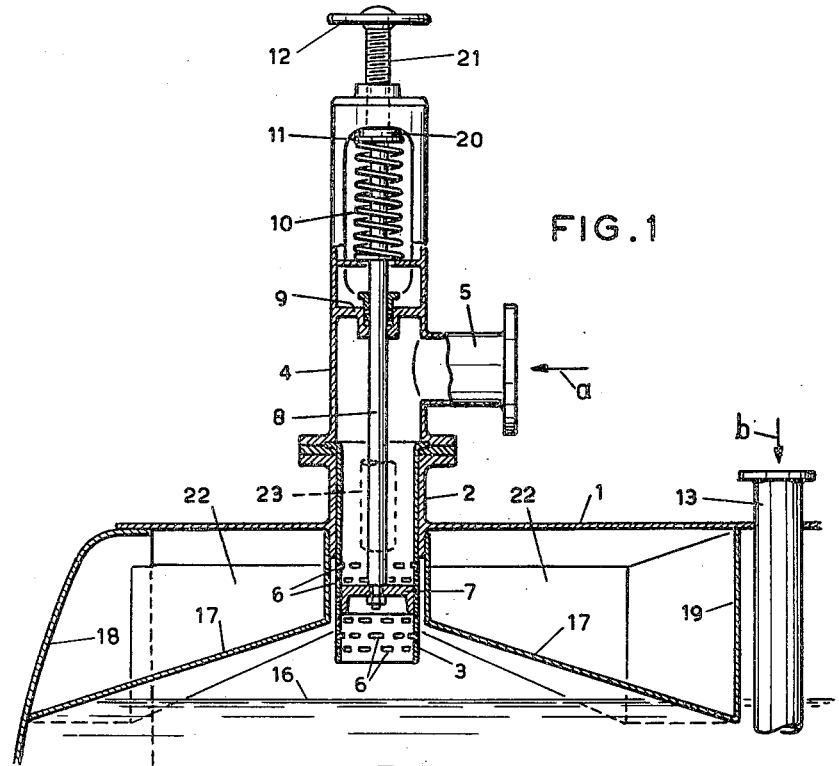
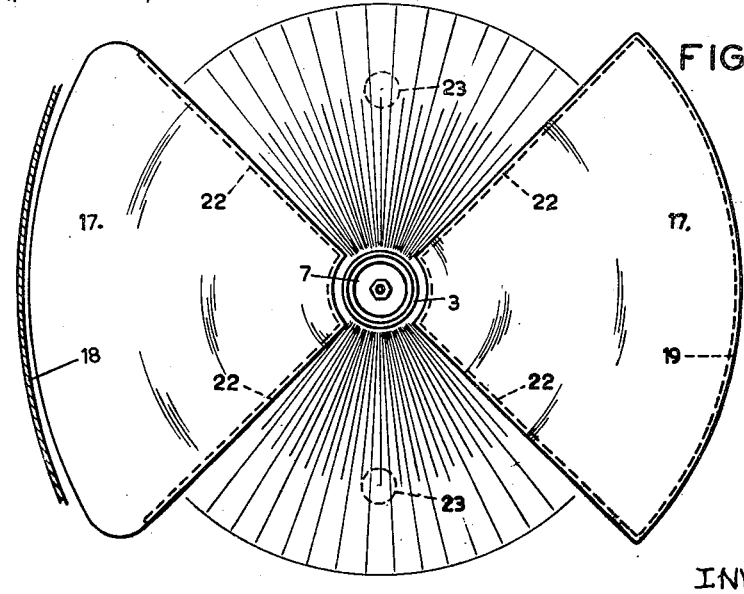
INVENTORS
JACOB J. KOLTHOF
CORNELIS J. CARON

United States Patent Office 3,048,379
Patented Aug. 7, 1962

3,048,379
APPARATUS FOR DEGASIFYING WATER, PARTICULARLY BOILER FEED WATER
Jacob J. Kolthof and Cornelis J. Caron, Hengelo, Netherlands, assignors to Koninklijke Machinefabriek Gebr. Stork & Co. N.V., Hengelo, Netherlands
Filed Oct. 19, 1960, Ser. No. 63,688
Claims priority, application Netherlands Nov. 23, 1959
1 Claim. (Cl. 261—127)

The invention relates to an apparatus for degasifying or deaerating water, particularly boiler feed water and consisting of a vessel which in its upper part is provided with a spraying device formed as a cylinder having spray holes in its circumferential wall, the flow area of said holes being controlled by a slide valve arranged in the cylinder and unmasking in its uppermost position the smallest flow area of the spray holes.

A spraying device of this kind has been described in British Patent 721,037 and such a spraying device presents the advantage that the upper surface of the annular screen formed by the water jets discharged by the spray holes also with varying loads of the degasifier remains always at the same level, so that the flow area for the gases escaping from the water to the outlet above the water screen is not obstructed.

According as the load of the degasifier decreases more rows of spray holes are closed by the piston or slide valve of said known spraying device so that for small loads the water screen will be very thin and present interruptions, whereby the drawback occurs, that the steam rising out of the water can escape from below the screen without heating the water of the screen.

The invention has for its object to remove said drawback of the known spraying device referred to above and according to the invention the spray holes are arranged in two opposed segments of the cylindrical wall of the spraying device, sector-shaped plates being joint to the unperforated cylinder segments and extend to below the liquid level in the vessel, said plates being laterally bound by vertical plates, which are radially directed along the outermost spray jets and the remaining outer boundary of the sector-shaped plates being constituted by walls extending to below the liquid level and joint at their upper end to the circumferential wall of the vessel. According to the capacity of the degasifier the segments of the cylindrical wall of the spraying device provided with spray holes may occupy a larger or smaller arc of the circumference of said cylindrical wall. With said arrangement the advantage is obtained that also for smaller loads of the degasifier still several rows of spray holes are open, so that the water screen thus obtained will still have a suitable thickness and by the provision of the sector shaped plates closed at their outer boundary between the cylinder segments provided with spray holes the steam rising at the liquid level is forced to flow through the water screens in order to heat same for driving out the gases.

In the accompanying drawing in which an embodiment of the spraying device according to the invention is illustrated FIG. 1 shows a sectional elevation of a part of the degasifying vessel, in which the spraying device according to the invention is mounted.

FIG. 2 is a bottom view of the spraying device together with the sector-shaped plates.

Placed in a tubular connection 2 on the top of the vessel 1 is a cylinder 3 and on said cylinder a tubular body 4 is supported, which is provided with a connection 5 for the pressure conduit 5 of a pump not shown on the drawing and delivering the water to be degasified into the vessel 1 (arrow *a*). The circumferential wall of the cylinder 3 is provided with spray holes 6 arranged in a number of rows in two opposed segments which in the embodiment shown each occupy an angle of substantially 90° and are diametrically opposed. Joint to the unperforated segments of the cylinder 3 are two sector-shaped plates 17 which are inclined downwards to below the water level 16 substantially under the same angle as the water screen formed by the spray holes. One of the plates 17 is joint to the end wall 18 of the vessel and the opposite plate 17 is joint to a vertical arcuate partition 19 extending unto the circumferential wall of the vessel, whereas the sector-shaped plates 17 are laterally bound by radially directed vertical plates 22 joint to the circumferential wall of the vessel. With the construction of the spraying device described the water, to be degasified and entering at 5 (arrow *a*), flows out through the holes 6 in the opposed perforated segments of cylinder 3 so that the issuing water jets constitute two opposed screens as shown in FIGURE 2. Said screens are laterally bound by plates 22 extending upwards at the radial edges of the sector-shaped plates 17 and preventing steam rising out of the water in the vessel to reach the space above the sector-shaped plates 17, so that all the steam is compelled to flow through the water screens in order to heat same.

The flow area of the spray holes 6 is controlled by a piston 7, secured to a rod 8 extending outwards through a stuffing box 9. The outward extending part of the rod 8 is embraced by a helical spring 10 abutting against a disc 11 lying against a collar 20 on the rod 8. The tension of spring tending to raise rod 8 with piston 7 may be adjusted by means of a threaded rod 21 having a handwheel 12 and limiting the upward movement of rod 8.

The upper side of the piston 7 is subjected to the pressure of the water supplied at *a* and the lower side of the piston is subjected to the pressure in the vessel 1 so that the piston is moved under the influence of the difference of both of said pressures. When the supply of water to the spraying device is decreased the pressure above the piston 7 will also be decreased and the piston will move upwards by the pressure of the expanding spring 10, said upward movement being limited by threaded rod 21. If the supply of water increases the pressure above the piston 7 will also increase and the piston will thus be urged downwards until the equilibrium is restored by the increase of the tension of spring 10. The thickness of the water screen is thereby increased.

Steam is introduced at *b* into the vessel through a conduit 13 and said steam is discharged below the water level 16 in order to ascend through the water into the steam space of the vessel above the water level. As the water jets discharged by the spray holes 6 give rise to cooling, steam and gases will flow towards the spraying device, so that the steam will heat the water screen and drive out the gases out of the water.

In the circumferential wall of the vessel above the sector-shaped water screens one or more outlets 23 are provided, through which the gases accumulated above said screens may escape.

It is to be noted that it is not required to control the piston 7 for varying the flow area of the spray holes by the pressure of the water to be gasified as the piston could also be controlled e.g. under the influence of the water level in the vessel 1 through the intermediary of a servo-motor.

What we claim is:

In an apparatus for degasifying water, particularly boiler feed water, and including a vessel for containing liquid at a predetermined level and provided in its upper part with a spraying device formed as a cylinder having spray holes in its circumferential wall, the flow area of said holes being controlled by a slide valve arranged in the cylinder and unmasking in its uppermost position the smallest flow area of the spray holes, said cylinder having an inlet for the water to be degasified and said vessel having at least one gas outlet in its wall near the spraying device and means for supplying heating steam below the water level in the vessel, the improvements comprising arrangement of said spray holes in two opposed segments of the cylindrical wall of the spraying device separated by two unperforated segments, a sector-shaped plate joined to each of said unperforated cylinder segments and extending downwardly in the vessel to a level below the liquid level, said plates being laterally bounded by vertical plates, which are radially directed along the outermost spray jets issuing from said spray holes, and the remaining outer boundary of the sector-shaped plates being constituted by walls extending to below the liquid level and joined at their upper ends to the circumferential wall of the vessel.

References Cited in the file of this patent

FOREIGN PATENTS 721,037     Great Britain  ------------ Dec. 29, 1954